United States Patent [19]
Neely, Jr.

[11] Patent Number: 5,498,284
[45] Date of Patent: Mar. 12, 1996

[54] CHEMICALLY BONDED INORGANIC POLYMER COATINGS AND CROSS-LINKING HARDENERS THEREFOR

[75] Inventor: James E. Neely, Jr., Butler, Pa.

[73] Assignee: Neely Industries, Inc., Butler, Pa.

[21] Appl. No.: 277,313

[22] Filed: Jul. 22, 1994

[51] Int. Cl.⁶ .................................................. C04B 12/04
[52] U.S. Cl. ........................ 106/629; 106/623; 106/626; 106/634; 106/635; 423/305; 423/312; 427/397.8; 428/426; 428/428; 428/432; 428/689
[58] Field of Search ...................... 106/626, 629, 106/634, 635, 623; 427/397.8; 423/305, 312; 428/426, 432, 688, 689, 428

[56] References Cited

U.S. PATENT DOCUMENTS

| | | | |
|---|---|---|---|
| 4,216,190 | 8/1980 | Neely, Jr. ....................... | 423/314 |
| 4,288,252 | 9/1981 | Neely ................................. | 106/74 |
| 4,312,673 | 1/1982 | Neely, Jr. ......................... | 106/74 |
| 4,312,844 | 1/1982 | Neely, Jr. et al. ............... | 423/314 |
| 4,319,926 | 3/1982 | Nowakowski et al. .......... | 106/629 |
| 4,329,327 | 5/1982 | Neely, Jr. et al. ............... | 423/314 |
| 4,333,016 | 2/1982 | Neely, Jr. et al. ............... | 428/34 |
| 4,333,914 | 6/1982 | Neely, Jr. et al. ............... | 423/314 |
| 4,334,941 | 6/1982 | Neely, Jr. ......................... | 156/107 |
| 4,412,863 | 11/1983 | Neely, Jr. ......................... | 106/84 |
| 4,478,905 | 10/1984 | Neely, Jr. ......................... | 428/324 |

Primary Examiner—Mark L. Bell
Assistant Examiner—Michael Marcheschi
Attorney, Agent, or Firm—Wenderoth, Lind & Ponack

[57] ABSTRACT

Aqueous coating compositions for glass or ceramic substrates contain at least one water soluble alkali silicate and a cross-linking agent produced by reacting at least one alkali hydroxide with an aluminum phosphate. The coating compositions are applied to a glass or ceramic substrate and heat cured.

15 Claims, No Drawings

CHEMICALLY BONDED INORGANIC POLYMER COATINGS AND CROSS-LINKING HARDENERS THEREFOR

The present invention relates to the field of inorganic heat-curable coatings for glass and ceramic articles. More particularly, the invention provides heat-curable water based coating compositions containing alkali silicate and a cross-linking hardener. The compositions are particularly useful as coating compositions for glass and ceramic articles.

BACKGROUND OF THE INVENTION

Aqueous alkali metal or ammonium silicate compositions containing inorganic curing agents are known. See, for example, Neely, U.S. Pat. No. 4,288,252.

In general, the prior art uses alkali silicates that are cross-linked with B-form aluminum trimetaphosphate. Cross-linking of the alkali silicate is attained by heating an article coated with the aqueous composition to an elevated temperature of 400° F. or higher.

The aqueous composition is made by mixing alkali silicate with fillers and/or pigments and placing the mixture in a sealed container. The B-form aluminum trimetaphosphate is mixed in water with or without pigments and fillers and stored in a second sealed container. Prior to use, the separate materials are mixed together. The separate containers are necessary since the B-form aluminum trimetaphosphate and alkali silicates undergo a non-cross-linking reaction even at room temperature to produce a solidified mass within about one day. Once the materials from the separate containers are mixed, the resulting inorganic paint composition must be used within about eight hours. Thus, the paint system must be prepared as a two pack system to prevent this undesirable reaction.

SUMMARY OF THE INVENTION

The present invention avoids the use of B-form aluminum trimetaphosphate hardener and other inorganic curing or hardening agents which have been previously employed and which have an undesirable low temperature reaction with the alkali silicates. In the present invention, it is possible to formulate the composition as a one pack system since there is no significant low temperature, e.g., room temperature, reaction between the alkali silicates and the cross-linking agent employed. This permits the formulation of inorganic paints as a single container system with a long shelf life.

DETAILED DESCRIPTION OF THE INVENTION

The present invention provides aqueous inorganic heat-curable coating compositions comprising at least one water soluble alkali silicate and an alkali aluminum phosphate cross-linking agent. The invention also provides the method for producing and using such coating compositions. Also provided are the alkali aluminum phosphate cross-linking agents and the method for their production. Additionally, the invention provides substrates which are coated with a heat-cured coating of the coating composition of the invention.

The aqueous coating compositions of the invention are composed of, in addition to water as the only necessary solvent, at least one water-soluble alkali silicate and an alkali aluminum phosphate cross-linking agent.

The alkali silicates employed herein are those which have been previously known for use in the formulation of inorganic silicate coating compositions. See, for example, Neely, U.S. Pat. No. 4,288,252. Sodium silicate and potassium silicate and mixtures thereof are illustrative.

The cross-linking agent employed here is an alkali aluminum phosphate agent which is free from aluminum trimetaphosphate and particularly from B-form aluminum trimetaphosphate. As previously stated, the presence of B-form aluminum trimetaphosphate in the cross-linking agent is undesirable since even at low temperatures of about room temperature, this material undergoes a non-cross-linking reaction with the alkali silicate to produce a solidified mass within about one day. This precludes the formulation of a one pack system using those materials. However, this undesirable low temperature reaction does not occur between the alkali silicate and the cross-linking agent of this invention, thus permitting the formulation of a one pack system which is storage stable for long periods of time.

The alkali aluminum phosphate cross-linking agent of this invention is the product produced by reacting at least one alkali hydroxide, e.g., sodium, potassium or lithium hydroxides or mixtures thereof, with an aluminum phosphate, e.g., aluminum dihydrogen phosphate, at an elevated temperature of about 400° to 800° C. for a period of from several seconds to several hours. The preferred temperature range is about 500° to 700° C. The reaction can be conducted in a single stage or in a two-stage reaction. In a two-stage reaction there is a low temperature, e.g., room temperature, reaction between the alkali hydroxide and the aluminum phosphate to obtain a precipitate. The precipitate is then subjected to a high temperature treatment at about 400° to 800° C. to form the cross-linking product. A single stage reaction in a liquid or solid state reaction is not, however, precluded.

The amount of alkali hydroxide mixed with the aluminum phosphate can vary such that the pH of the reacted mixture ranges from about 3 to 10, with the preferred range being from about 4 to 8.

The low and elevated temperature reactions can be conducted in an open or ventilated container and the elevated temperature reaction may be conducted by using a spray drying/firing technique. The time of the elevated temperature reaction is dependent upon the rate of heat transfer to the reaction mass and will vary with the mode of heating and reaction vessel. In a reaction vessel, the reaction time may be one to several hours in order to reach the reaction temperature at the center of the reaction mass, while in a spray drying/firing system the time may be only a matter of seconds.

The product of the elevated temperature reaction is typically a mixture of compounds and can be directly employed as the cross-linking agent of the invention without isolation of the individual component compounds. Usually one or more of the compounds are present in major amounts, with one or more compounds being present in minor amounts. In general, 20% by weight or more would constitute a major amount and less than 20% by weight would be considered a minor amount. However, major constituents are generally in the range of 30–80% by weight and minor constituents would generally be 10% or less.

As an illustrative method, the cross-linking agent may be prepared by combining and mixing, at room temperature, an aqueous solution of the alkali hydroxide with an aqueous solution of an aluminum phosphate. An exothermic reaction ensues and a reaction product is formed as a precipitate during the mixing. The precipitated reaction product is isolated and placed in a container and dried, for example, at 100° to 150° C., for from about two hours to overnight. The dried reaction product is then heated to and held at an elevated temperature of about 400° to 800° C. for from several seconds to several hours to form the cross-linking product. The product may then be cooled and washed with water and then dried. In some instances, washing with water has been found desirable but is not essential in all cases.

The following is an illustrative listing of components which may be present in the mixture produced by the reaction of potassium, sodium and lithium hydroxides respectively with an aluminum phosphate. These components need not be present in a single reaction product. Some of the components may be present in major amounts while others are present in minor amounts.

Potassium $KAlP_2O_7$  $KPO_3$  $KH_2PO_4$  $AlPO_4$  $K_3PO_4$
$Al_3(PO_4)_2(OH)_3 \cdot 9H_2O$  $K_3Al_2(PO_4)_3$  $K_5P_3O_{10} \cdot 2H_2O$
$AlPO_4 \cdot xH_2O$  $K_3HP_2O_7 \cdot 3H_2O$  $KH_3P_2O_7 \cdot H_2O$  $K_5P_3O_{10}$
$K_4P_2O_7 \cdot 2K_2HPO_4$  $K_8H_2[PO_4]_2(P_2O_7)$  $K_2H_8(PO_4)_2(P_2O_7)$
$K_3H_3(PO_4)_2$  $KH_2PO_4$ Sodium $Na_7(AlP_2O_7)_4(PO_4)$  $Na_3Al_2(PO_4)_3$  $Na_2(AlP_3O_{10}) \cdot 2H_2O$
$Na_6(PO_3)_6 \cdot 6H_2O$  $Na_4P_2O_7$  $Na_3HP_2O_7 \cdot H_2O$  $Na_3PO_4$  $NaPO_3$
$AlPO_4 \cdot xH_2O$  $AlH_3(PO_4)_2 \cdot H_2O$  $Na_2H_2(PO_3)_4$
$Na_2AlP_2O_{10} \cdot 2H_2O$  $AlPO_4$  $Na_2Al_6P_2O_{15} \cdot 10H_2O$  $NaAl(HPO_4)_2$  $Al_{11}(PO_4)_9(OH)_6 \cdot xH_2O$  $3NaPO_3 \cdot 6H_2O$
$NaH_2PO_3 \cdot xH_2O$ Lithium $Li_3PO_4$  $Li_4P_2O_7$  $Li_2HPO_3$  $Al_2(PO_4)(OH)_3$  $AlPO_4$
$AlHP_2O_7 \cdot xH_2O$  $LiAl(PO_4)_2(OH)$  $2Al(PO_4) \cdot 3H_2O$
$LiAlH_4(P_2O_7)_2$  $AlH_2P_3O_{10}$  $Li_5P_3O_{10} \cdot 5H_2O$  $AlHP_2O_7 \cdot xH_2O$
$4LiPO_3 \cdot 2H_2O$  $4LiPO_3 \cdot 8H_2O$  $4LiPO_3 \cdot 6H_2O$  $Li_3HP_2O_7 \cdot H_2O$
$AlH_3(PO_4) \cdot 3H_2O$  $Li_2HPO_3$ Following the reaction, the product is cooled and reduced to a fine powder. In the case of dry milling operations, the resultant powder is mixed with water to form a slurry. The slurry may then be further milled to improve dispersion. Pigments may be added to the slurry to likewise improve dispersion of the pigments in the final composition.

The aqueous slurry containing the cross-linking agent as described above is then blended with the necessary alkali silicate such as sodium or potassium silicate or mixtures thereof.

Prior to such blending, fillers, pigments and other additives to modify coating properties may be blended with the alkali silicate or such materials may be added after the blending of the slurry containing the cross-linking agent with the alkali silicate.

Fillers may be naturally occurring minerals or man made oxides or other inorganic materials. Examples of suitable fillers are silica, feldspar, mica, wallastonite, alumina, zircon, graphite, silicon carbide, oxide glasses, silver, stainless steel and iron.

Pigments which can be employed are illustrated as follows: Ferrous/ferrite oxide, ferric oxide, titanium dioxide, copper chromite, manganese ferrite, chromium hematite, cobalt, zinc aluminate and titania-coated mica.

The pigments employed—either alone or as mixtures—will, of course, be those which are stable to the curing temperature employed when the composition is applied to the requisite substrate and heat cured.

Water, surfactants, defoamers and other additives can be added to vary solids content, viscosity and other properties of the composition. Water is the only necessary solvent.

After all ingredients are mixed to attain the proper desired properties of the composition, such composition is sealed in a single container and stored until it is applied to a desired substrate by conventional methods and heat cured.

The compositions can vary widely in respect to their content. The weight ratio of solids of alkali silicate to alkali aluminum phosphate cross-linking agent can be in the range of 1:1 to 40:1 with a preferred range of 2:1 to 20:1. The weight percent of pigments and fillers in the composition can range from 5 to 70% with a preferred range of 15 to 60%.

The weight percents of pigments and fillers are interdependent upon each other. As the percent of one increases, the percent of the other will decrease. In addition, the weight percent of the pigment or filler is greatly dependent upon the particle size and particle size distribution of either. As the particle size distribution becomes smaller, the percent of the pigment or filler must decrease in order to make a coating with good properties.

In general, the amounts of surfactants, defoamers and additives that act as both a surfactant and defoamer, fall within typical ranges suggested by the supplier of the additives for smaller applications. These ranges recommended by suppliers are typically 0.001% to 0.1%.

The heat curable compositions are particularly useful as functional or decorative coatings for glass and ceramics. Black coatings for the perimeter of automotive glass is envisaged as a primary application. The use of other colors of pigments instead of black will provide products for architectural and bottle glass. Decorative coatings for ceramic tile is visualized as a further principle use.

The heat curable coating composition, following formulation, can be applied by conventional methods such as spraying, brush coating, screen printing and the like onto the desired substrate such as, for example, glass or ceramic. The coated substrate is then heated to an elevated temperature of about 350° to 1300° F. (about 175° to 700° C.) to cure the coating on the substrate.

The surface of the substrate to which the composition is applied before curing should be clean, i.e., free from cutting oils, fingerprints and the like. In some instances, for example, in architectural glass, the substrate may be one containing a metal/metal oxide film on the surface which has been formed by vapor deposition methods.

The following examples are provided to illustrate the invention. Such examples are not to be construed as limiting the scope of the invention.

The following EXAMPLES 1–3 illustrate the preparation of the cross-linking product of the invention.

EXAMPLE 1

600 Grams of a 50% by weight aqueous solution of potassium hydroxide is mixed with 1000 grams of a 50% by weight aqueous solution of aluminum dihydrogen phosphate at room temperature. An exothermic reaction ensues and a precipitate or reaction product is formed during the mixing. The reaction product is isolated and placed in a container and dried at 100° C. for two hours. The dried reaction product is then heated to and held at 650° C. for two hours to form a cross-linking product. After cooling to room temperature, the mixture is washed with water and dried. The product contains a mixture of compounds and X-ray diffraction indicates the presence of $K_3Al_2(PO_4)_3$, $KAlP_2O_7$, $KPO_3$ and $AlPO_4 \cdot xH_2O$ as components of the mixture.

EXAMPLE 2

An aqueous solution of sodium hydroxide is prepared by mixing 230 grams of sodium hydroxide with 585 grams of water. This solution is then mixed, at room temperature, with 1000 grams of a 50% by weight aqueous solution of aluminum dihydrogen phosphate. An exothermic reaction ensues and a precipitate or reaction product is formed during the mixing. The reaction product is isolated and placed in a container and dried in an oven at 150° C. overnight. The dried reaction product is then heated to and held at 500° C. for three hours to form a cross-linking product. The product contains a mixture of compounds and X-ray diffraction indicates the presence of $Na_7(AlP_2O_7)_4$, $Na_3Al_2(PO_4)_3$, $Na_6(PO_3)_6 \cdot 6H_2O$, $Na_4P_2O_7$, $AlPO_4 \cdot xH_2O$, $Na_3PO_4$ and $NaPO_3$ as components of the mixture.

EXAMPLE 3

An aqueous solution of lithium hydroxide is prepared by mixing 270 grams of lithium hydroxide monohydrate with 2250 grams of water. This solution is then mixed, at room temperature, with 1000 grams of a 50% by weight aqueous solution of aluminum dihydrogen phosphate. An exothermic reaction ensues and a precipitate or reaction product is formed during the mixing. The reaction product is isolated and placed in a container and dried in a microwave oven. The dried reaction product is then heated to and held at a temperature of 550° for three hours to form a cross-linking product. The product contains a mixture of compounds and X-ray diffraction confirms the presence of $Li_4P_2O_7$, $Li_3PO_4$, $AlPO_4$, $Li_2HPO_3$ and $AlHP_2O_7 \cdot xH_2O$ as components of the mixture.

The following EXAMPLES 4–7 illustrate the formulation of the coating compositions of the invention and the application of such compositions to a substrate followed by curing to form a durable adherent coating on the substrate.

EXAMPLE 4

120 Grams of a potassium silicate solution with a silica/alkali oxide weight ratio of 2.5/1 is placed into a dispersion mill. A slurry containing 8 grams of water and 4 grams of a cross-linking product as, for example, the material of EXAMPLE 3 is prepared by mixing or processing in a dispersion mill. This mixture is then added to the potassium silicate in the dispersion mill. 20 Grams of a copper chromite and 40 grams of manganese ferrite spinel pigments are added to the mill. The mixture is milled for 30 minutes. Other desired additives may be placed into the mill or added to the mixture after removal from the mill. The black coating is then applied to a clean glass substrate by any convenient means. The coated substrate is then placed into a furnace at 1300° F. for three minutes, removed, and cooled to room temperature by natural convection to form a black, durable, adherent coating on the glass.

EXAMPLE 5

120 Grams of a potassium silicate solution with a silica/alkali oxide weight ratio of 2.5/1 is placed into a dispersion mill. A slurry containing 8 grams of water and 4 grams of a cross-linking product, such as, for example that of EXAMPLE 1 is prepared by mixing or processing in a dispersion mill. This mixture is then added to the potassium silicate in the dispersion mill. 20 Grams of ferrous/ferrite oxide pigment is added to the mill. The mixture is milled for 60 minutes. Other additives may be placed into the mill or added to the mixture after removal from the mill. The black coating is then applied to a clean glass substrate by any convenient means. The coated substrate is then placed in a furnace at 450° F. for fifteen minutes, removed, and cooled to room temperature by natural convention to form a black, durable, adherent coating on the glass.

EXAMPLE 6

20 Grams of a potassium silicate solution with a silica/alkali oxide weight ratio of 2.5/1 is placed into a dispersion mill. A slurry containing 8 grams of water and 4 grams of a cross-linking product such as, for example, that of EXAMPLE 2 is prepared by mixing or processing in a dispersion mill. This mixture is then added to the potassium silicate in the dispersion mill. 30 Grams of copper chromite oxide pigment is added to the mill. The mixture is milled for 60 minutes. Other additives may be placed into the mill or added to the mixture after removal from the mill. The black coating is then applied to a clean glass substrate by any convenient means. The coated substrate is then placed into a furnace at 350° F. for fifteen minutes, removed, and cooled to room temperature by natural convection to form a black, durable, adherent coating on the glass.

EXAMPLE 7

120 Grams of a potassium silicate solution with a silica/alkali oxide weight ratio of 2.5/1 is placed into a dispersion mill. A slurry containing 10 grams of water and 4 grams of a cross-linking product such as, for example, that of EXAMPLE 1 is prepared by mixing or processing in a dispersion mill. This mixture is then added to the potassium silicate in the dispersion mill. 25 Grams of chromium hematite oxide pigment is added to the mill. The mixture is milled for 60 minutes. Other additives may be placed into the mill or added to the mixture after removal from the mill. The green coating is then applied to an architectural glass substrate, that has a vacuum-coated metal/metal oxide film, by any convenient means. The coated glass is then placed into a furnace at 350° F. for fifteen minutes, removed, and cooled to room temperature by natural convection to form a green, durable, coating adhered to and protecting the vacuum coating on the glass.

I claim:

1. An aqueous inorganic heat-curable coating composition which comprises at least one water soluble alkali silicate and a cross-linking effective amount of a cross-linking agent which is a product produced by a process which comprises mixing, at room temperature, an aqueous solution of an alkali hydroxide with an aqueous solution of aluminum phosphate, allowing the mixture to react to form a precipitate, isolating and drying the precipitate, and heating the dried precipitate at a temperature of about 400° to 800° C. for from several seconds to several hours.

2. A composition according to claim 1, further containing an inorganic pigment.

3. A composition according to claim 2, further containing at least one member selected from the group consisting of a filler, a surfactant and a defoamer.

4. A composition according to claim 1, wherein the ratio of solids of alkali silicate to cross-linking agent is in the range of 1:1 to 40:1.

5. A composition according to claim 4, wherein the ratio of solids is in the range of 2:1 to 20:1.

6. A composition according to claim 3, wherein the weight percent of pigments and filler in the composition ranges from 5 to 70 percent.

7. A composition according to claim 6, wherein the weight percent ranges from 15 to 60 percent.

8. A composition according to claim 1, wherein the alkali hydroxide is at least one member selected from the group consisting of sodium hydroxide, potassium hydroxide and lithium hydroxide.

9. A composition according to claim 1, wherein the aluminum phosphate is aluminum dihydrogen phosphate.

10. A cross-linking agent produced by a process which comprises mixing, at room temperature, an aqueous solution of an alkali hydroxide with an aqueous solution of aluminum phosphate, allowing the mixture to react to form a precipitate, isolating and drying the precipitate, and heating the dried precipitate at a temperature of about 400° to 800° C. for from several seconds to several hours.

11. A cross-linking agent according to claim 10, wherein the alkali hydroxide is at least one member selected from the group consisting of sodium hydroxide, potassium hydroxide and lithium hydroxide and the aluminum phosphate is aluminum dihydrogen phosphate.

12. A method for the production of a coated ceramic substrate which comprises applying a composition according to claim 1 to a ceramic substrate and subjecting such coated substrate to heat curing at a temperature of about 350° to 1300° F.

13. A method for the production of a coated ceramic substrate which comprises applying a composition according to claim 2 to a ceramic substrate and subjecting such coated substrate to heat curing at a temperature of about 350° to 1300° F.

14. A coated ceramic substrate produced in accordance with claim 12.

15. A coated ceramic substrate produced in accordance with claim 13.

* * * * *